(12) United States Patent
Hsu et al.

(10) Patent No.: US 11,074,838 B2
(45) Date of Patent: Jul. 27, 2021

(54) IMAGE GENERATION SYSTEM INCLUDING A SPINNING DISPLAY

(71) Applicant: Disney Enterprises, Inc., Burbank, CA (US)

(72) Inventors: Jonathan R. Hsu, Pomona, CA (US); Nathan Nocon, Valencia, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/002,947

(22) Filed: Jun. 7, 2018

(65) Prior Publication Data
US 2019/0378444 A1    Dec. 12, 2019

(51) Int. Cl.
| | |
|---|---|
| G09G 3/00 | (2006.01) |
| G09F 19/12 | (2006.01) |
| H02K 7/14 | (2006.01) |
| H02P 31/00 | (2006.01) |

(52) U.S. Cl.
CPC .............. G09F 19/12 (2013.01); G09G 3/005 (2013.01); H02K 7/14 (2013.01); H02P 31/00 (2013.01)

(58) Field of Classification Search
CPC .......... G09F 19/12; G09G 3/005; H02K 7/14; H02P 31/00
See application file for complete search history.

(56) References Cited

U.S. PATENT DOCUMENTS

| | | | |
|---|---|---|---|
| 4,687,167 A * | 8/1987 | Skalka | ............... A47B 21/0314 108/103 |
| 4,943,851 A | 7/1990 | Lang | |
| 5,057,827 A | 10/1991 | Nobile | |
| 5,148,310 A | 9/1992 | Batchko | |
| 5,239,892 A | 8/1993 | Sakai | |
| 5,437,235 A * | 8/1995 | Randolph | .............. A47B 21/00 108/25 |
| 5,714,997 A | 2/1998 | Anderson | |

(Continued)

FOREIGN PATENT DOCUMENTS

| | | |
|---|---|---|
| JP | S58-154913 U | 10/1983 |
| JP | H1-280992 A | 11/1989 |

(Continued)

OTHER PUBLICATIONS

Horimai, Hideyoshi, et al. "Full-Color 3D Display System with 360 Degree Horizontal Viewing Angle." *Proc. Int. Symposium of 3D and Contents*, 2010. pp. 1-4.

(Continued)

*Primary Examiner* — Carolyn R Edwards
(74) *Attorney, Agent, or Firm* — Farjami & Farjami LLP

(57) ABSTRACT

According to one implementation, an image generation system includes a base having a rotor and a motor for spinning the rotor about an axis of rotation, and a display secured to the rotor, wherein a center of mass of the display is situated off of the axis of rotation. Such an image generation system also includes a first counterweight coupled to the rotor and having a first location relative to the rotor, and a second counterweight coupled the to the rotor and having a second location relative to the rotor different than the first location. The first counterweight and the second counterweight are configured to stabilize the display while the display is spun by the motor and the rotor.

20 Claims, 7 Drawing Sheets

(56) References Cited

U.S. PATENT DOCUMENTS

| | | | |
|---|---|---|---|
| 5,815,314 A * | 9/1998 | Sudo | H04N 13/32 359/472 |
| 6,115,006 A * | 9/2000 | Brotz | G02B 30/54 345/6 |
| 6,183,088 B1 | 2/2001 | LoRe | |
| 6,208,318 B1 | 3/2001 | Anderson | |
| 6,481,851 B1 | 11/2002 | McNelley | |
| 6,801,185 B2 | 10/2004 | Salley | |
| 6,886,281 B2 * | 5/2005 | Smith | G09F 11/02 340/815.83 |
| 7,002,604 B1 | 2/2006 | Barrus | |
| 7,477,252 B2 * | 1/2009 | Chun | G06T 15/08 345/427 |
| 7,490,941 B2 | 2/2009 | Mintz | |
| 7,587,120 B2 | 9/2009 | Koo | |
| 7,708,640 B2 | 5/2010 | Burak | |
| 8,233,032 B2 | 7/2012 | Yukich | |
| 8,698,966 B2 | 4/2014 | Liu | |
| 9,053,660 B2 | 6/2015 | Liu | |
| 9,186,595 B1 | 11/2015 | Cannon | |
| 10,310,284 B1 | 6/2019 | Waldron | |
| 2002/0148148 A1 * | 10/2002 | Smith | G09F 15/0087 40/473 |
| 2003/0142067 A1 | 7/2003 | Kurtenbach | |
| 2004/0082283 A1 * | 4/2004 | Lindell | B24B 41/042 451/343 |
| 2004/0196362 A1 | 10/2004 | Hoshino et al. | |
| 2005/0035962 A1 * | 2/2005 | Ishibashi | G09G 3/005 345/419 |
| 2005/0083570 A1 * | 4/2005 | Ueda | G02B 21/0012 359/384 |
| 2005/0284997 A1 * | 12/2005 | Tisbo | F16M 13/022 248/276.1 |
| 2006/0171008 A1 | 8/2006 | Mintz et al. | |
| 2007/0139769 A1 | 6/2007 | DeCusatis et al. | |
| 2007/0293299 A1 | 12/2007 | Aida | |
| 2008/0218854 A1 | 9/2008 | Hoshino et al. | |
| 2009/0312979 A1 | 12/2009 | Pan | |
| 2010/0007582 A1 | 1/2010 | Zalewski | |
| 2010/0195055 A1 | 8/2010 | Maekawa | |
| 2011/0199373 A1 * | 8/2011 | Liu | G02B 30/54 345/419 |
| 2012/0146897 A1 | 6/2012 | Yoshida et al. | |
| 2012/0194419 A1 | 8/2012 | Osterhout | |
| 2012/0293941 A1 * | 11/2012 | Myerchin | F16M 11/10 361/679.22 |
| 2013/0033650 A1 | 2/2013 | Roberts | |
| 2013/0050198 A1 | 2/2013 | Song | |
| 2013/0092805 A1 * | 4/2013 | Funk | F16M 13/00 248/121 |
| 2013/0100126 A1 * | 4/2013 | Kim | H04N 13/393 345/419 |
| 2013/0100358 A1 | 4/2013 | De Collibus | |
| 2013/0343743 A1 | 12/2013 | Yen | |
| 2014/0091942 A1 * | 4/2014 | Matloff | G09G 3/002 340/815.53 |
| 2014/0118271 A1 | 5/2014 | Lee | |
| 2014/0307068 A1 | 10/2014 | Song et al. | |
| 2015/0193084 A1 | 7/2015 | Juni | |
| 2015/0212718 A1 | 7/2015 | Kellhammer | |
| 2015/0288857 A1 | 10/2015 | Fay et al. | |
| 2017/0009935 A1 * | 1/2017 | Theis | F16M 13/022 |
| 2017/0023911 A1 | 1/2017 | Russell et al. | |
| 2017/0038829 A1 | 2/2017 | Lanier | |
| 2017/0115488 A1 | 4/2017 | Ambrus | |
| 2017/0140791 A1 | 5/2017 | Das et al. | |
| 2017/0343804 A1 | 11/2017 | Choi | |
| 2018/0024373 A1 | 1/2018 | Joseph | |
| 2018/0224678 A1 | 8/2018 | Jung | |
| 2019/0156710 A1 * | 5/2019 | Hanson | G09F 9/302 |

FOREIGN PATENT DOCUMENTS

| | | |
|---|---|---|
| JP | H9-238369 A | 9/1997 |
| JP | 2004-54150 A | 2/2004 |
| JP | 2005-221946 A | 8/2005 |
| JP | 2005-275398 A | 9/2005 |
| JP | 2010-273013 A | 12/2010 |

OTHER PUBLICATIONS

File History of Related U.S. Appl. No. 15/888,896, filed Feb. 5, 2018, and titled "Floating Image Display System".

File History of Related U.S. Appl. No. 15/985,477, filed May 21, 2018, and titled "Electrical Charger for a Spinning Device".

File History of Related U.S. Appl. No. 15/985,502, filed May 21, 2018, and titled "Display of a Floating Image With Depth Enhancement".

File History of Related U.S. Appl. No. 15/983,006, filed May 17, 2018, and titled "Multi-Perspective Display of an Image".

File History of Related U.S. Appl. No. 16/011,505, filed Jun. 18, 2018, and titled "Image Display System With Visual Filter".

Yasuhiro Suzuk, et al. "Research of Real World Life-Sized Video Avatar Presentation System," *Proceedings of the Virtual Reality Society of Japan Annual Conference 10*, Sep. 29, 2005, pp. 111-114.

Hikechi Maeda, et al. "Experimental Development and Evaluation of All-Around Display System for Video Avatar in the Real World," *Proceedings of the Virtual Reality Society of Japan Annual Conference 8*, Sep. 3, 2003.

* cited by examiner

Static Balance: $M_1L_1 + M_3L_3 - M_2L_2 = 0$

Dynamic Balance: $M_1 r_1 + M_3 r_3 - M_2 r_2 = 0$

IMAGE GENERATION SYSTEM INCLUDING A SPINNING DISPLAY

BACKGROUND

Advances in computer technology and software have made possible the creation of richly featured virtual characters capable of simulating interactivity with a human observer of the virtual character. The illusion of interactivity may be even greater when the virtual character appears to be independent of the image generation system displaying it. For example, the virtual character may be shown as an apparently three-dimensional (3D) image that appears to float in space. Moreover, the immersiveness of the experience for the observer may be further enhanced if the virtual image appears to float serenely and effortlessly in space, without perceptible jitter or flicker.

SUMMARY

There are provided systems and methods for generating an image using a spinning display, substantially as shown in and/or described in connection with at least one of the figures, and as set forth more completely in the claims.

DETAILED DESCRIPTION

Figure 1:
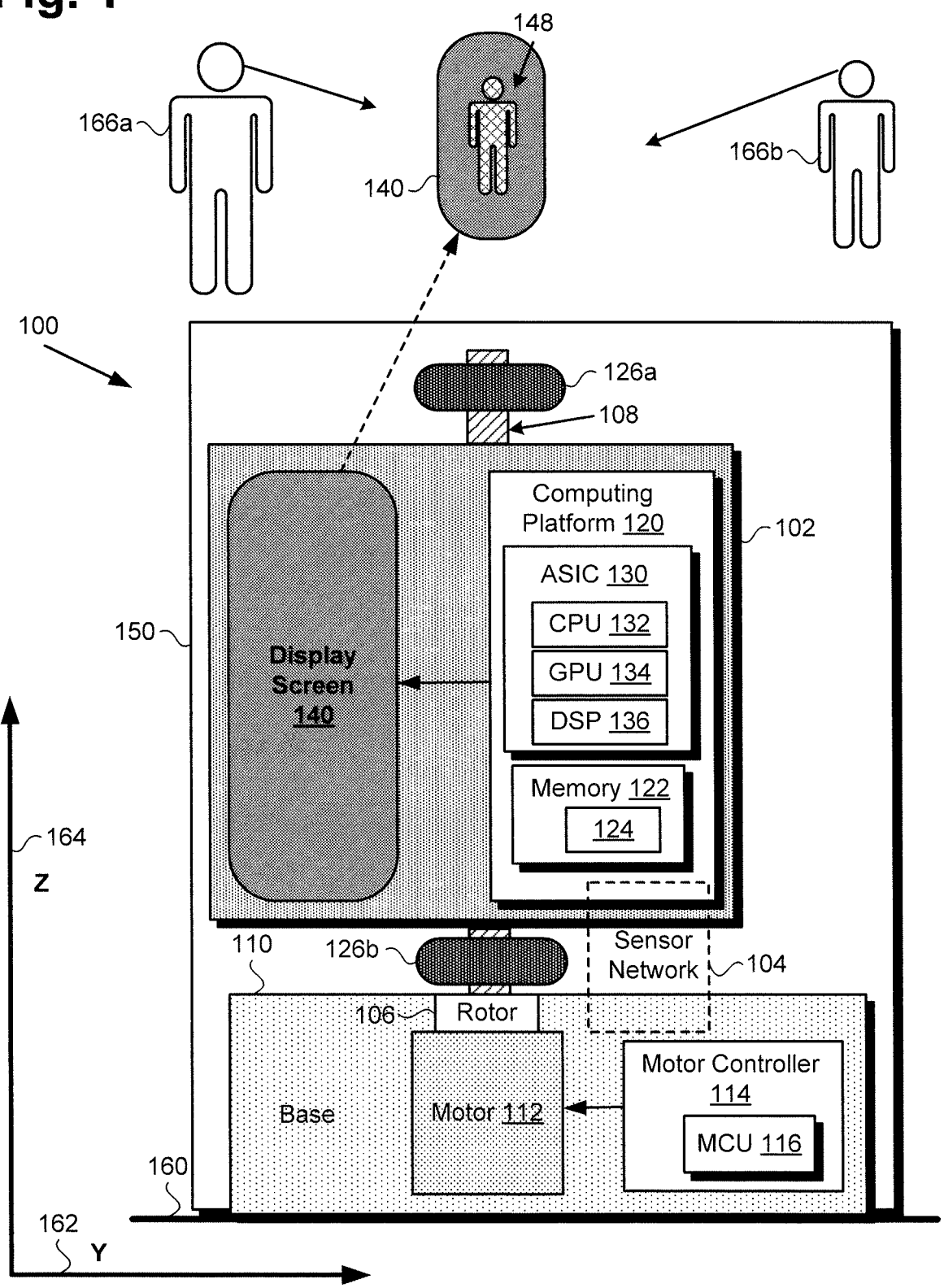
FIG. 1 shows a diagram of an exemplary image generation system including a spinning display, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for generating an image using a spinning display. FIG. 1 shows a diagram of exemplary image generation system 100, according to one implementation. As shown in FIG. 1, image generation system 100 includes display 102 configured to spin about an axis of rotation while having its center-of-mass off of the axis of rotation (axis of rotation not shown in FIG. 1). In addition, exemplary image generation system 100 includes stationary base 110 coupled to display 102 by rotor 106 and bracket 108 securing display 102 to rotor 106, and may further include masking shutter 150 surrounding at least display 102.

As further shown in FIG. 1, display 102 includes display screen 140, and computing platform 120 communicatively coupled to display screen 140 so as to control display screen 140. Computing platform 120 includes application specific integrated circuit (ASIC) 130 including central processing unit (CPU) 132 implemented as a hardware processor, graphics processing unit (GPU) 134 also implemented as a hardware processor, and may further include digital signal processor (DSP) 136. Computing platform 120 also includes system memory 122 implemented as a non-transitory storage device storing software code 124.

Base 110 includes motor 112 for rotating rotor 106, bracket 108, and display 102, as well as motor controller circuit 114 including motor control unit (MCU) 116. Base 110 is situated on surface 160, which may be a floor or any other substantially horizontal surface. In addition, FIG. 1 shows horizontal axis 162 substantially parallel to surface 160 and designated herein as the "Y" axis, and vertical axis 164 substantially perpendicular to surface 160 and designated herein as the "Z" axis. Also shown in FIG. 1 are first counterweight 126a, second counterweight 126b, sensor network 104 bridging base 110 and display 102, and image 148 displayed by display 102, as well as observers 166a and 166b viewing image 148 from different perspectives.

By way of definition, as used in the present application, the terms "render" and "rendering" are defined to mean causing one or more images to appear on a display screen, such as display screen 140. Thus, rendering an image may mean causing an entirely new image to appear on the display, or refreshing an image previously appearing on the display. Moreover, as used in the present application, the terms "central processing unit" or "CPU" and "graphics processing unit" or "GPU" have their customary meaning in the art. That is to say, a CPU includes an Arithmetic Logic Unit (ALU) for carrying out the arithmetic and logical operations of computing platform 120, as well as a Control Unit (CU) for retrieving programs, such as software code 124, from system memory 122. A GPU is configured to reduce the processing overhead of the CPU by performing computationally intensive graphics processing tasks.

Sensor network 104 can include a base sensor unit integrated with base 110 and a rotating sensor unit integrated with display 102 and configured to rotate with display 102. According to one implementation, the base sensor unit may include one or more of an infrared (IR) light-emitting diode (LED), a magnet, a visible light LED, and a glyph or other visible marker, to name a few examples. The rotating sensor unit may include one or more of an IR receiver for sensing the IR LED, a Hall effect sensor for sensing the magnet, a photo diode for sensing the visible light LED, and one or more camera(s) for sensing the glyph or visible marker.

However, in another implementation, one or more of the IR LED, the magnet, the visible light LED, and the glyph or visible marker may be included in the rotating sensor unit, while one or more of the IR receiver, the Hall effect sensor, the photo diode, and the camera(s) may be included in the base sensor unit. It is noted that sensor unit 104 may be utilized to track the rotational position and/or spin rate of display 102. Moreover, the combination of computing platform 120 of display 102, sensor network 104, and motor controller circuit 114 of base 110 enable the necessary time synchronization between the revolutions per second (rps) of motor 112 and rotor 106, and the frame rate in frames per second (fps) at which display 102 renders images.

It is further noted that although FIG. 1 shows two observers 166a and 166b, that representation is provided merely for conceptual clarity. More generally, observers 166a and 166b may correspond to a single observer, or to more or many more than two observers who may be positioned so as to view image 148 from a variety of perspectives.

Figure 2A:
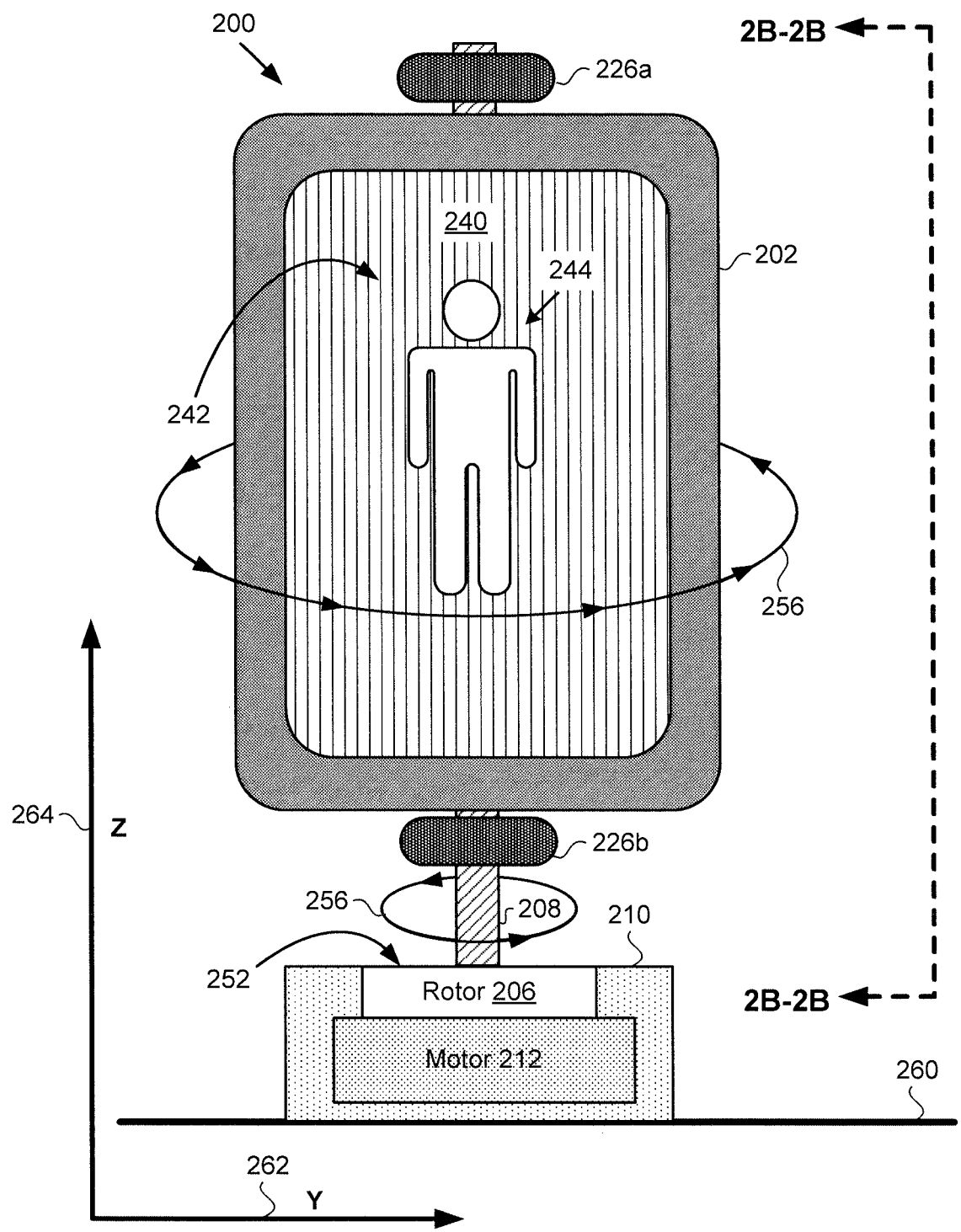
FIG. 2A shows a front view of an exemplary image generation system including a spinning display, according to one implementation.

FIG. 2A shows a front view of exemplary image generation system 200, according to one implementation. As shown in FIG. 2A, image generation system 200 includes base 210 and display 202. Base 210 is shown to include motor 212, and is situated on surface 260, which may be a floor or any other substantially horizontal surface. In addition, according to the exemplary implementation shown in FIG. 2A, image generation system 200 includes first counterweight 226a, second counterweight 226b, rotor 206 having top surface 252, and bracket 208 securing display 202 to rotor 206 at top surface 252 of rotor 206.

Display 202 includes display screen 240 having display surface 242. Also shown in FIG. 2A are horizontal Y axis 262 substantially parallel to surface 260, vertical Z axis 264 substantially perpendicular to surface 260, two-dimensional (2D) graphic 244 rendered on display screen 240, and spin direction 256 of rotor 206, bracket 208, and display 202.

Image generation system 200 corresponds in general to image generation system 100, in FIG. 1. As a result, image generation system 200 may share any of the features or functionality attributed to image generation system 100 by the present disclosure, and vice versa. In addition, rotor 206 and base 210 including motor 212, correspond respectively in general to rotor 106 and base 110 including motor 112, in FIG. 1. Thus, rotor 206, base 210, and motor 212, may share any of the features or functionality attributed to rotor 106, base 110, and motor 112, by the present disclosure, and vice versa. That is to say, although not explicitly shown in FIG. 2A, base 210 includes features corresponding respectively to motor controller circuit 114 and MCU 116.

Moreover, display 202 including display screen 240 having display surface 242 corresponds in general to display 102 including display screen 140, in FIG. 1. Thus, display 202 and display screen 240 may share any of the features or functionality attributed to display 102 and display screen 140 by the present disclosure, and vice versa. In other words, although not explicitly shown in FIG. 2A, display 202 includes features corresponding respectively to computing platform 120 including ASIC 130 having CPU 132, GPU 134, and DSP 136, and further including system memory 122 storing software code 124.

Furthermore, bracket 208 securing display 202 to rotor 206, and first and second counterweights 226a and 226b correspond respectively to bracket 108 and first and second counterweights 126a and 126b, in FIG. 1. Thus, bracket 208, first counterweight 226a, and second counterweight 226b may share any of the features or functionality attributed to respective bracket 108, first counterweight 126a, and second counterweight 126b by the present disclosure, and vice versa.

Figure 2B:
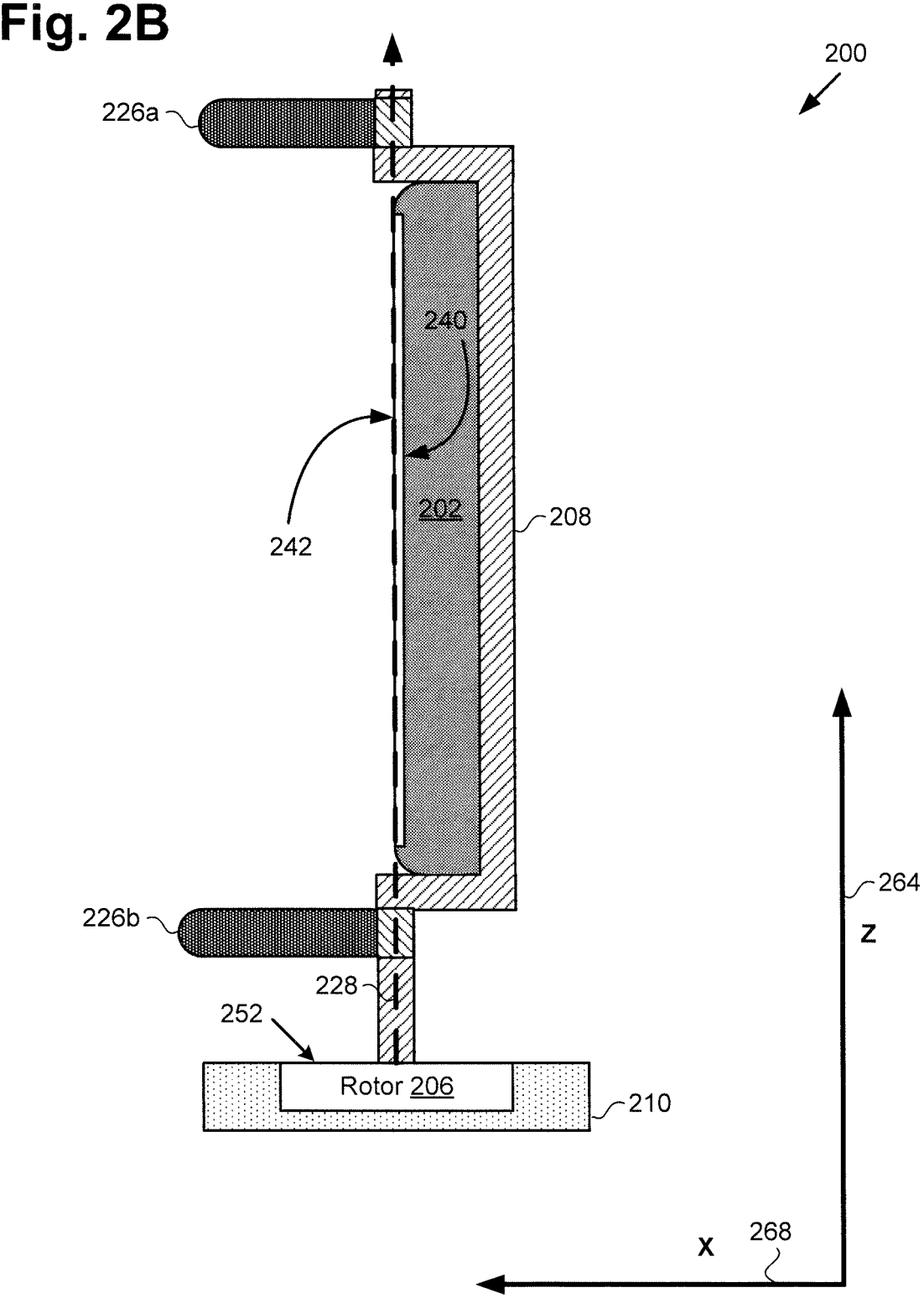
FIG. 2B shows a side view of the exemplary image generation system shown in FIG. 2A.

FIG. 2B shows a side view of exemplary image displays system 100/200 along perspective lines 2B-2B in FIG. 2A, according to one implementation. As shown in FIG. 2B, image generation system 100/200 includes base 110/210 including rotor 106/206 having top surface 252, and display 102/202 secured to rotor 106/206 at top surface 252 of rotor 106/206 by bracket 108/208. In addition, image generation system 100/200 includes first counterweight 126a/226a having a first location relative to top surface 252 of rotor 106/206, and second counterweight 126b/226b having a second location relative to top surface 252 of rotor 106/206 that is different from the location of first counterweight 126a/226a.

Display 102/202 includes display screen 140/240 having display surface 242. Also shown in FIG. 2B are horizontal X axis 268 substantially parallel to surface 160/260 and substantially perpendicular to horizontal Y axis 162/262 in FIGS. 1 and 2A, vertical Z axis 164/264, and axis of rotation 228 of rotor 106/206 and display 102/202.

As shown in FIG. 2B, in one implementation, first counterweight 126a/226a and second counterweight 126b/226b may be coupled to rotor 106/206 through attachment to bracket 108/208 securing display 102/202 to rotor 106/206. For example, and according to the exemplary implementations shown in FIGS. 1, 2A, and 2B, first counterweight 126a/226a may be attached to bracket 108/208 so as to be situated above display 102/202, while second counterweight 126b/226b may be attached to bracket 108/208 so as to be situated between display 102/202 and rotor 106/206.

As further shown in FIG. 2B, bracket 108/208 securing display 102/202 to rotor 106/206 may adjoin rotor 106/206 on axis of rotation 228 of rotor 106/206 and display 102/202. However, it is noted that bracket 108/208 has its center-of-mass off of axis of rotation 223.

Moreover, and also shown in FIG. 2B, in some implementations, display surface 242 of display 102/202 may be situated on axis of rotation 228 of rotor 106/206 and display 102/202. For example, in some implementations, display surface 242 may be precisely aligned so as to be on axis of rotation 228 and so as to be centered on axis of rotation 228.

Referring to FIGS. 1, 2A, and 2B in combination, display screen 140/240 may be controlled by CPU 132 and/or GPU 134 of ASIC 130, while rotor 106/206 coupled to bracket 108/208 and display 102/202 is controlled by CPU 132 of ASIC 130. CPU 132 of ASIC 130 is configured to execute software code 124 to render 2D graphic 244 on display screen 140/240.

CPU 132 is further configured to execute software code 124 to utilize motor 112/212 to spin rotor 106/206, bracket 108/208, and display 102/202 about axis of rotation 228 at a predetermined spin rate to generate image 148 corresponding to 2D graphic 244. As a result of the image generation performed by spinning of display 102/202, image 148 may appear to be floating in space, and/or may appear to be a three-dimensional (3D) image corresponding to 2D graphic 244.

In some implementations, display screen 140/240 may be a liquid-crystal display (LCD) screen, for example. Moreover, in some implementations, display screen 140/240 may be provided by a mobile communication device serving as display 102/202, the mobile communication device being secured to rotor 106/206 by bracket 108/208, and being configured to spin with rotor 106/206 at the predetermined spin rate. For example, display screen 140/240 may be part of a smartphone or a tablet computer including computing platform 120.

It is noted that CPU 132 may execute software code 124 to control motor 112/212 in order to spin rotor 106/206 and display 102/202 about axis of rotation 228 at a varying spin rate, or at a substantially constant predetermined spin rate. It is also noted that spin direction 256 may be in either a counter clockwise direction with respect to the plane of horizontal axis 162/262, as shown in FIG. 2A, or in a clockwise direction with respect to that plane.

In some implementations, CPU 132 may execute software code 124 to use GPU 134 to change 2D graphic 244 as rotor 106/206 and display 102/202 spin, so as to generate multiple perspectives of image 148 that are appropriate respectively to the locations of each of observers 166a and 166b. For example, observer 166a located so as to face a front side of image 148 and stationary at that location might consistently view image 148 from a frontal perspective. By contrast, observer 166b located so as to face a backside of image 148, i.e., 180° apart from the perspective of observer 166a, and stationary at that location might consistently view image 148 as if from the rear.

First counterweight 126a/226a and second counterweight 126b/226b are configured to stabilize display 102/202 while display 102/202 is spun by motor 112/212 and rotor 106/206. For example, first counterweight 126a/226a and second counterweight 126b/226b may be configured to provide static balance for display 102/202 while display 102/202 and rotor 106/206 are at a standstill. Moreover, first counterweight 126a/226a and second counterweight 126b/226b may be configured to provide dynamic balance for display 102/202 while display 102/202 and rotor 106/206 spin.

It is noted, that as used herein, the expression "stabilize display 102/202 while display spins," and the like refer to the substantial avoidance or suppression of vibration by display 102/202 while motor 112/212 and rotor 106/206 are used to spin display 102/202. That is to say, stabilizing display 102/202 advantageously enables generation of image 148 as a floating and/or 3D image corresponding to 2D graphic 244 that is substantially free of jitter or flicker.

Figure 3A:
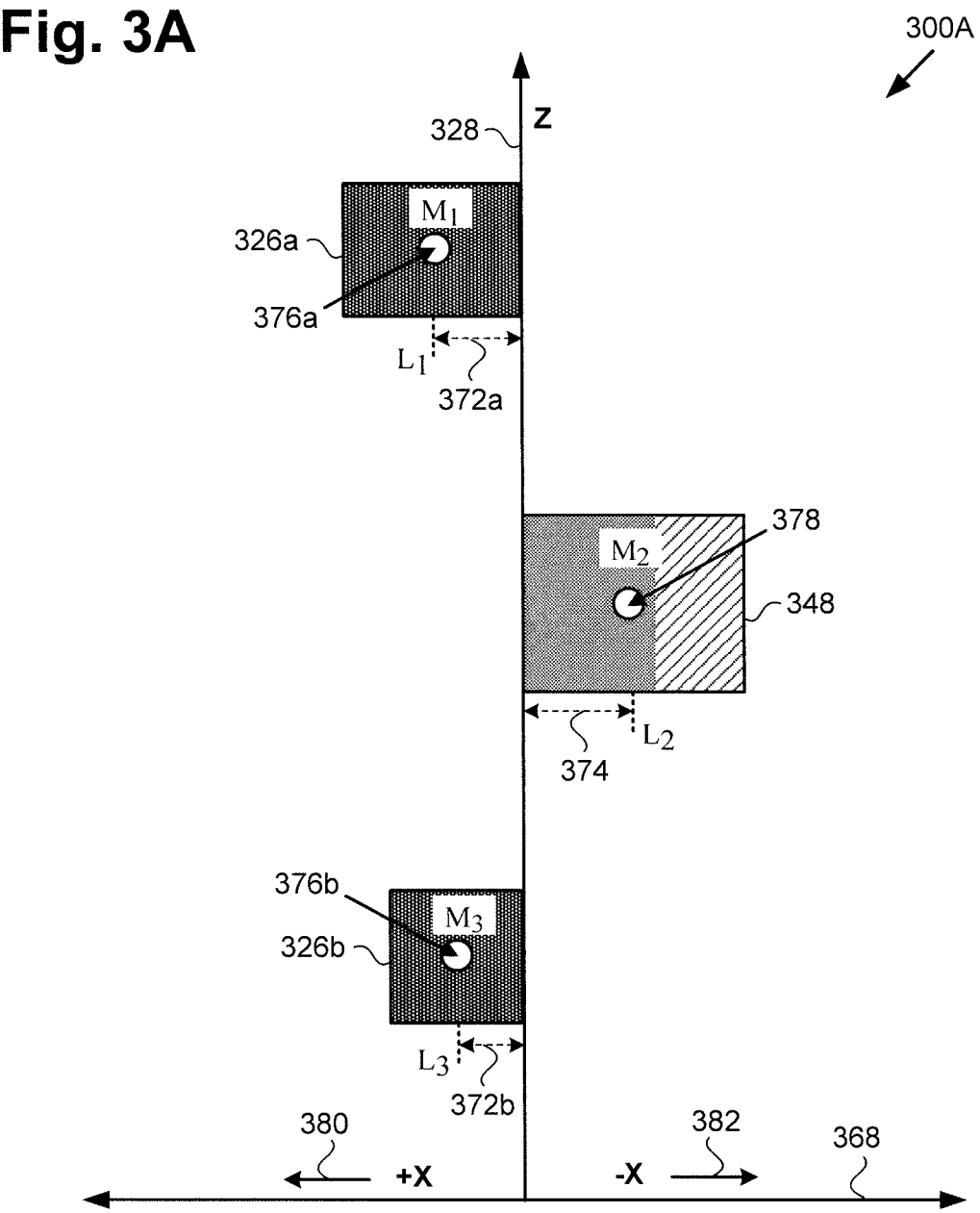
FIG. 3A shows a diagram depicting a static balance condition for the exemplary image generation systems of FIGS. 1, 2A, and 2B.

FIG. 3A shows a diagram depicting a static balance condition for the exemplary image generation systems of FIGS. 1, 2A, and 2B. Diagram 300A includes horizontal X axis 368 having positive X direction 380 and negative X direction 382, as well as axis of rotation 328 perpendicular to X axis 368 and parallel to the Z direction defined by vertical Z axis 164/264 in FIGS. 1, 2A, and 2B. In addition, diagram 300A includes first counterweight 326a having mass $M_1$ and center-of-mass 376a, second counterweight 326b having mass $M_3$ and center-of-mass 376b, and mass 348 having mass $M_2$ and center-of-mass 378. Also shown in FIG. 3A are linear displacements 372a ($L_1$) and 372b ($L_3$) of respective centers-of-mass 376a and 376b from axis of rotation 328 in positive X direction 380, as well as linear displacement 374 ($L_2$) of center-of-mass 378 from axis of rotation 328.

First counterweight 326a and second counterweight 326b correspond respectively to first counterweight 126a/226a and second counterweight 126b/226b, in FIGS. 1, 2A, and 2B. As a result, first counterweight 326a and second counterweight 326b may share any of the features or functionality attributed to first counterweight 126a/226a and second counterweight 126b/226b by the present disclosure, and vice versa. Thus, like first counterweight 326a and second counterweight 326b, first counterweight 126a/226a and second counterweight 126b/226b may have respective masses $M_1$ and $M_3$, and respective centers-of-mass 376a and 376b. Moreover, like first counterweight 126a/226a and second counterweight 126b/226b, first counterweight 326a and second counterweight 326b may be coupled to rotor 106/206 through attachment to bracket 108/208.

Horizontal X axis 368 and axis of rotation 328 correspond respectively to horizontal X axis 268 and axis of rotation 228, in FIG. 2B. Consequently, horizontal X axis 368 and axis of rotation 328 may share any of the features attributed to horizontal X axis 268 and axis of rotation 228 by the present disclosure, and vice versa. Moreover, mass 348 may correspond to the mass of bracket 108/208 and/or display 102/202 in FIGS. 1, 2A, and 2B, while center-of-mass 378 may correspond to either the center-of-mass of display 102/202 or to the center-of-mass of the combined mass of bracket 108/208 and display 102/202. That is to say, mass 348 and center-of-mass 378 may correspond respectively to the mass and center-of-mass of display 102/202 in implementations in which the mass of bracket 108/208 is negligible.

As shown in FIG. 3A, static balance for mass 348, first counterweight 126a/226a/326a, and second counterweight 126b/226b/326b may be achieved when the following constraint is met:

$$M_1 L_1 + M_3 L_3 - M_2 L_2 = 0 \quad \text{(Equation 1)}$$

Thus, the respective masses and linear displacements perpendicular to axis of rotation 228/328 for first and second counterweights 126a/226a/326a and 126b/226b/326b may be determined based on the values of $M_2$ and $L_2$, according to Equation 1. It is noted that, in some implementations, mass $M_1$ of first counterweight 126a/226a/326a may be equal to mass $M_3$ of second counterweight 126b/226b/326b, and in other implementations may be unequal.

Figure 3B:
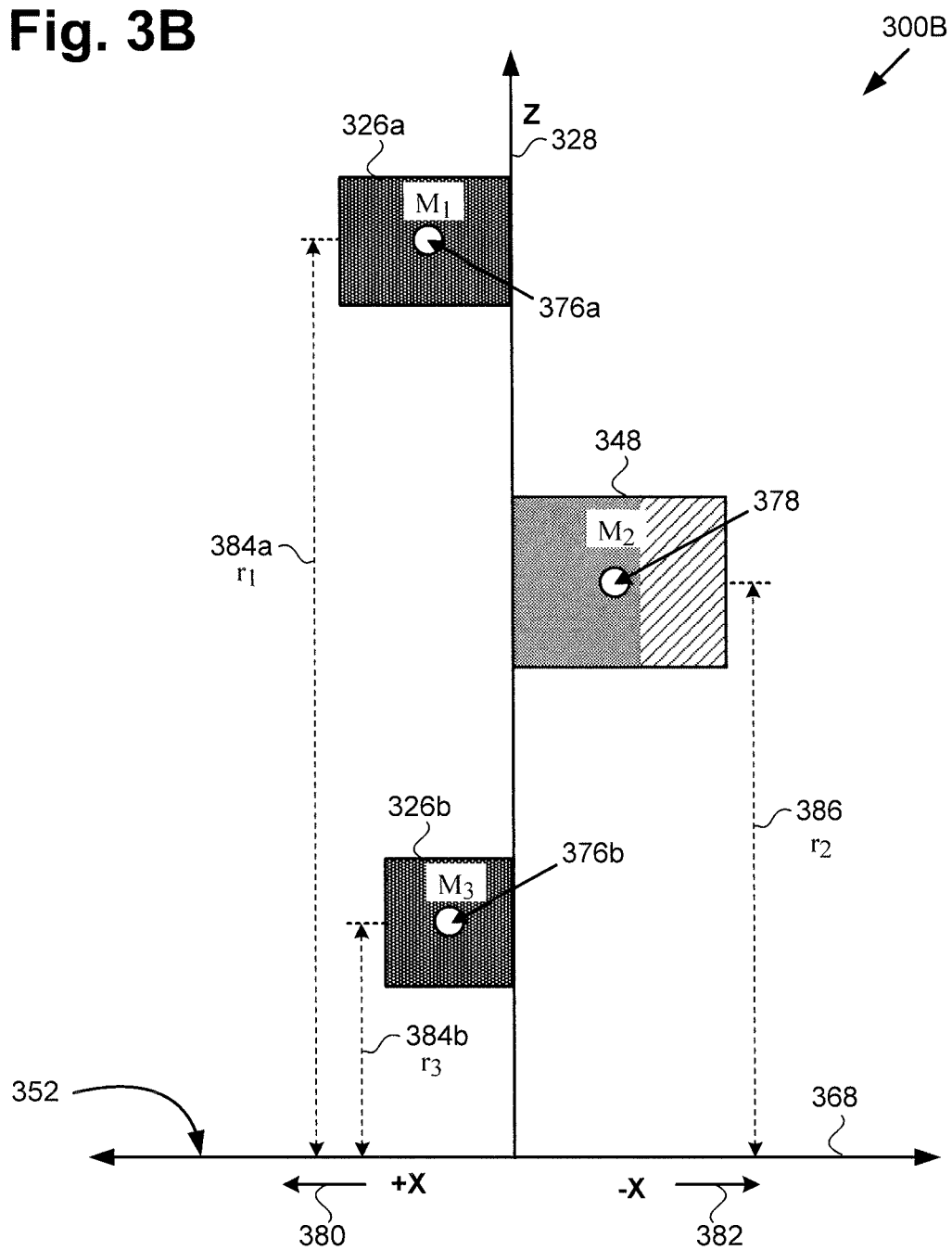
FIG. 3B shows a diagram depicting a dynamic balance condition for the exemplary image generation systems of FIGS. 1, 2A, and 2B.

FIG. 3B shows a diagram depicting a dynamic balance condition for the exemplary image generation systems of FIGS. 1, 2A, and 2B. Diagram 300B includes horizontal X axis 268/368 having positive X direction 380 and negative X direction 382, as well as axis of rotation 228/328 perpendicular to X axis 268/368. It is noted that axis of rotation 228/328 intersects X axis 268/368 at surface 352 in the X-Y plane. It is further noted that surface 352 corresponds to top surface 252 of rotor 106/206 shown in FIGS. 2A and 2B.

In addition, diagram 300B includes first counterweight 126/226a/326a having mass $M_1$ and center-of-mass 376a, second counterweight 126b/226b/326b having mass $M_3$ and center-of-mass 376b, and mass 348 having mass $M_2$ and center-of-mass 378. Also shown in FIG. 3A are linear Z axis displacements 384a ($r_1$), 384b ($r_3$), and 386 ($r_2$) of respective centers-of-mass 376a, 376b, and 378 from X axis 268/368.

As shown in FIG. 3B, dynamic balance for mass 348, first counterweight 126a/226a/326a, and second counterweight 126b/226b/326b may be achieved when the following constraint is met:

$$M_1 r_1 M_3 r_3 M_2 r_2 = 0 \quad \text{(Equation 2)}$$

Thus, the respective masses and linear displacements perpendicular to X axis 268/368 for first and second counterweights 126a/226a/326a and 126b/226b/326b may be determined based on the values of $M_2$ and $r_2$, according to Equation 2. As noted above, in some implementations, mass $M_1$ of first counterweight 126a/226a/326a may be equal to mass $M_3$ of second counterweight 126b/226b/326b, and in other implementations may be unequal.

Figure 4:
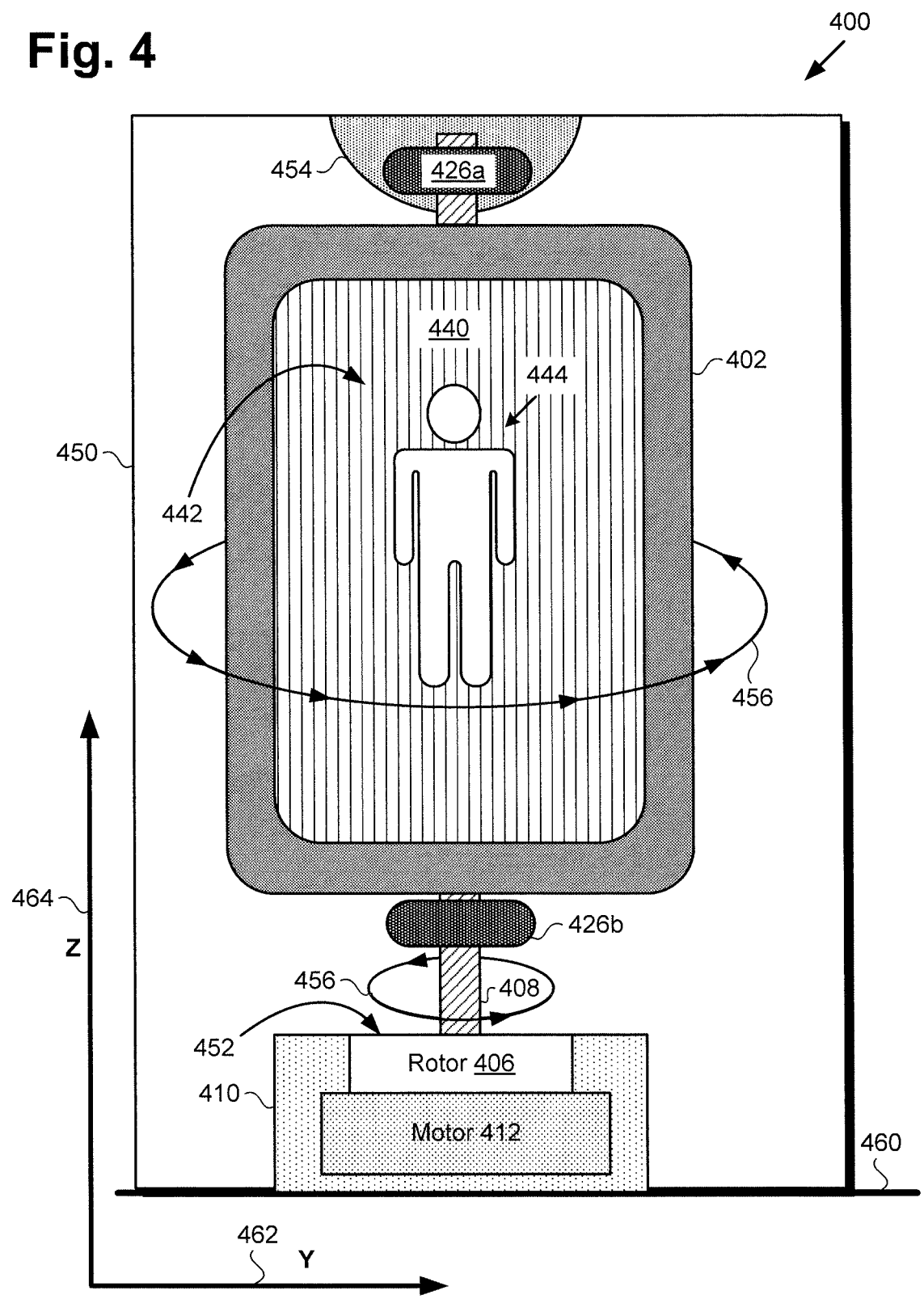
FIG. 4 shows a front view of an exemplary image generation system including a spinning display, according to another implementation.

FIG. 4 shows a front view of exemplary image generation system 400, according to another implementation. As shown in FIG. 4, image generation system 400 includes base 410 and display 402. Base 410 is shown to include motor 412, and is situated on surface 460, which may be a floor or any other substantially horizontal surface. In addition, according to the exemplary implementation shown in FIG. 4, image generation system 400 includes first counterweight 426a, second counterweight 426b, masking shutter 450 including counterweight housing 454, rotor 406 having top surface 452, and bracket 408 securing display 402 to rotor 406 at top surface 452 of rotor 406.

Display 402 includes display screen 440 having display surface 442. Also shown in FIG. 4 are horizontal Y axis 462 substantially parallel to surface 460, vertical Z axis 464 substantially perpendicular to surface 460, 2D graphic 444 rendered on display screen 440, and spin direction 456 of rotor 406, bracket 408, and display 402.

Image generation system 400 corresponds in general to image generation system 100/200, in FIGS. 1, 2A, and 2B. As a result, image generation system 200 may share any of the features or functionality attributed to image generation system 100/200 by the present disclosure, and vice versa. In addition, rotor 406 and base 410 including motor 412, correspond respectively in general to rotor 106/206 and base 110/210 including motor 112/212, in FIGS. 1, 2A, and 2B. Thus, rotor 406, base 410, and motor 412, may share any of the features or functionality attributed to rotor 106/206, base 110/210, and motor 112/212, by the present disclosure, and vice versa. That is to say, although not explicitly shown in FIG. 4, base 410 includes features corresponding respectively to motor controller circuit 114 and MCU 116.

Moreover, display 402 including display screen 440 having display surface 442 corresponds in general to display 102/202 including display screen 140/240 having display surface 242, in FIGS. 1, 2A, and 2B. Thus, display 402 and display screen 440 may share any of the features or functionality attributed to display 102/202 and display screen 140/240 by the present disclosure, and vice versa. In other words, although not explicitly shown in FIG. 4, display 402 includes features corresponding respectively to computing platform 120 including ASIC 130 having CPU 132, GPU 134, and DSP 136, and further including system memory 122 storing software code 124. In addition, although also not explicitly shown in FIG. 4, like display 102/202, display 402 is configured to spin about axis of rotation 228/328 in FIGS. 2B, 3A, and 3B.

Bracket 408 securing display 402 to rotor 406 corresponds to bracket 108/208 in FIGS. 1, 2A, and 2B. Thus, bracket 408 may share any of the features or functionality attributed to bracket 108/208 by the present disclosure, and vice versa. Moreover, first and second counterweights 426a and 426b correspond respectively to first and second counterweights 126a/226a/326a and 126b/226b/326b, in FIGS. 1, 2A, 2B, 3A, and 3B. Thus, first counterweight 426a and second counterweight 426b may share any of the features or functionality attributed to respective first counterweight 126a/226a/326a, and second counterweight 126b/226b/326b by the present disclosure, and vice versa.

In some use cases, it may be advantageous or desirable to enhance the illusion that image 148 is floating in space independently of display 102/202/402. It may be further advantageous or desirable to screen first counterweight 126a/226a/326a/426a from view. When implemented for those use cases, display 102/202/402 may be surrounded by masking shutter 150/450, while first counterweight 126a/226a/326a/426a may be enclosed and thereby screened from view by counterweight housing 454.

Masking shutter 150/450 may be implemented as a liquid-crystal shutter, such as a polymer-dispersed liquid-crystal (PDLC), or "smart glass" shutter, for example. Alternatively, masking shutter 150/450 may be implemented using any suitable electrochromic, photochromic, or thermochromic material. For example, in one implementation, masking shutter 150/450 may be implemented as a suspended-particle device (SPD), while in another implementation, masking shutter 150/450 may be implemented using a material that changes transparency in response to exposure to ultraviolet (UV) light.

It is noted that, as used in the present application, the term "electrochromic" refers to a material that changes transparency, e.g., transitions from an opaque mode to a transparent mode, in response to the application of a control voltage to the material or to removal of a control voltage applied to the material. By analogy, the term "photochromic" refers to a material that changes transparency in response to exposure to light. By further analogy, the term "thermochromic" refers to a material that changes transparency in response to exposure to heat.

It is further noted that, as used in the present application, the term "suspended-particle device" or "SPD" refers to a masking shutter in which particles dispersed in a liquid or on a film have their orientations substantially aligned through application of a control voltage to the SPD, thereby causing the SPD to transition from an opaque mode to a transparent mode. The term "polymer-dispersed liquid-crystal" or "PDLC" refers to a material in which liquid crystals dispersed in a polymer film align in response to an applied control voltage, thereby causing the PDLC material to transition from substantially opaque to substantially transparent.

Figure 5:
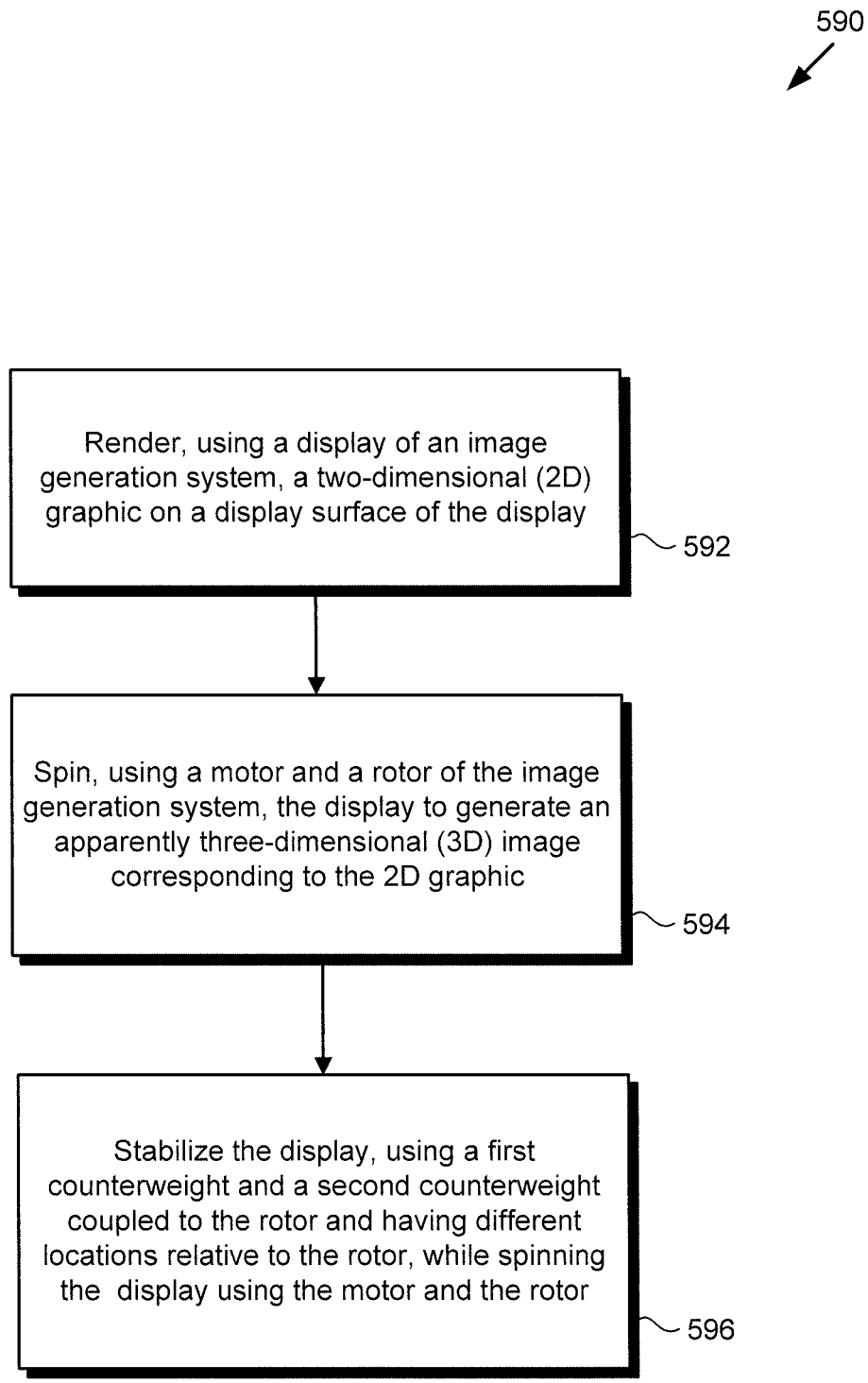
FIG. 5 shows a flowchart outlining an exemplary method for generating an image using a spinning display, according to one implementation.

The functionality of image generation system 100/200/400 including display 102/202/402 configured to spin will be further described by reference to FIG. 5. FIG. 5 shows flowchart 590 of an exemplary method for generating an image using a spinning display, according to one implementation. With respect to the method outlined in FIG. 5, it is noted that certain details and features have been left out of flowchart 590 in order not to obscure the discussion of the inventive features in the present application.

Referring to FIG. 5 in combination with FIGS. 1, 2A, 2B, and 4, flowchart 590 begins with rendering 2D graphic 244/444 on display surface 242/442 of display 102/202/402 (action 592). Rendering of 2D graphic 244/444 on display surface 242/442 of display 102/202/402 may be performed by software code 124, executed by CPU 132 of ASIC 130, and may include use of GPU 134.

Flowchart 590 continues with spinning display 102/202/402 to generate apparently 3D image 148 corresponding to 2D graphic 244/444 (action 594). Referring to FIGS. 3A and 3B in combination with FIGS. 1, 2A, 2B, and 4, as noted above, spinning of display 102/202/402 about axis of rotation 228/328 is performed using motor 112/212/412 and rotor 106/206/406, and may be performed using a predetermined spin rate or a variable spin rate. As further noted above, as a result of the image generation performed by spinning of display 102/202/402, image 148 may appear to be a 3D image corresponding to 2D graphic 244/444. Furthermore, image 148 may appear to float in space.

Flowchart 590 can conclude with stabilizing display 102/202/402, using first counterweight 126a/226a/326a/426a and second counterweight 126b/226b/326b/426b having different locations relative to rotor 106/206/406, while spinning display 102/202/402 using motor 112/212/412 and rotor 106/206/406 (action 596). In some implementations, first counterweight 126a/226a/326a/426a and second counterweight 126b/226b/326b/426b may be configured to stabilize display 102/202/402 when display 102/202/402 spins at a spin rate of greater than ten rps. For example, in some implementations, first counterweight 126a/226a/326a/426a and second counterweight 126b/226b/326b/426b may be configured to stabilize display 102/202/402 when display 102/202/402 spins at a spin rate in a range from forty rps to fifty rps.

Referring to the disclosure provided above by reference to FIGS. 3A and 3B, display 102/202/402 may be stabilized while spinning through satisfaction of the constraints imposed by Equation 1 and/or Equation 2. For example, as shown in FIG. 3B, first counterweight 126a/226a/326a/426a may be situated such that its center-of-mass 376a is displaced vertical distance 384a ($r_1$) from surface 252/352, while second counterweight 126b/226b/326b/426b may be situated such that its center-of-mass 376b is displaced vertical distance 384b ($r_3$) from surface 252/352. Moreover, in some implementations, and as further shown by FIG. 3A, first counterweight 126a/226a/326a/426a may be situated such that its center-of-mass 376a is displaced horizontal distance 372a ($L_1$) from axis of rotation 228/328, while second counterweight 126b/226b/326b/426b may be situated such that its center-of-mass 376b is displaced horizontal distance 372b ($L_3$) from axis of rotation 228/328.

Thus, the present application discloses systems and methods for generating an image using a spinning display. By rendering a 2D graphic on a display surface of a display and spinning the display using a motor and a rotor, the systems and methods disclosed by the present application enable the generation of an apparently 3D image corresponding to the 2D graphic. Moreover, by stabilizing the display, using a first counterweight and a second counterweight coupled to the rotor and having different locations relative to the rotor, while spinning the display, the present solution can advantageously create the illusion that the 3D image is floating serenely in space, without perceptible jitter or flicker.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image generation system comprising:
   a base including a rotor and a motor for spinning the rotor about a single axis of rotation;
   a bracket coupled to the rotor;
   a display secured to the bracket, wherein a center of mass of the display is situated off of the single axis of rotation;
   a first counterweight coupled to the bracket, along the single axis of rotation, between a first side of the display and the rotor;
   a second counterweight coupled to the bracket, along the single axis of rotation, on a second side of the display opposite the first side of the display;
   wherein the first counterweight and the second counterweight are configured to stabilize the display while the display is spun by the motor and the rotor, and wherein the rotor is configured to spin the display, the first counterweight, and the second counterweight in a spin direction about the single axis of rotation.

2. The image generation system of claim 1, wherein a display surface of the display is on the axis of rotation, the first side is below the display, and the second side is above the display when the image generation system is resting on the base.

3. The image generation system of claim 1, wherein the first counterweight and the second counterweight are configured to stabilize the display when the display spins at a spin rate of greater than forty revolutions per second.

4. The image generation system of claim 1, wherein a mass of the first counterweight and a mass of the second counterweight are equal.

5. The image generation system of claim 1, wherein the display is configured to render a two-dimensional (2D) graphic while the display spins, resulting in generation of an apparently three-dimensional (3D) image corresponding to the 2D graphic.

6. The image generation system of claim 1, wherein the first counterweight is situated above the display, and the second counterweight is situated below the display.

7. The image generation system of claim 1, wherein the bracket adjoins the rotor on the axis of rotation.

8. The image display system of claim 7, wherein a center of mass of the bracket is off of the axis of rotation.

9. The image generation system of claim 1, wherein the display is part of a mobile communication device configured to spin with the rotor.

10. The image generation system of claim 9, wherein the mobile communication device comprises a smartphone.

11. The image generation system of claim 9, wherein the mobile communication device comprises a tablet computer.

12. A method for use by an image generation system having a base including a rotor and a motor for spinning the rotor about a single axis of rotation, a bracket coupled to the rotor, a display secured to the bracket, wherein a center of mass of the display is situated off of the single axis of rotation, a first counterweight coupled to the bracket along the single axis of rotation, and a second counterweight coupled to the bracket along the single axis of rotation, the method comprising:
   rendering, using the display, a graphic on a display surface of the display; and
   spinning, using the motor and the rotor, the display in a spin direction about the single axis of rotation; and
   while spinning the display, stabilizing the display using the first counterweight coupled to the bracket between a first side of the display and the rotor and the second counterweight coupled to the bracket on a second side of the display opposite the first side of the display.

13. The method of claim 12, wherein a display surface of the display is on the axis of rotation, the first side is below the display, and the second side is above the display when the image generation system is resting on the base.

14. The method of claim 12, wherein the first counterweight and the second counterweight are configured to stabilize the display when the display spins at a spin rate of greater than forty revolutions per second.

15. The method of claim 12, wherein a mass of the first counterweight and a mass of the second counterweight are equal.

16. The method of claim 12, wherein the first counterweight is situated above the display, and the second counterweight is situated below the display.

17. The method of claim 12, wherein the bracket has a center-of-mass off of the axis of rotation.

18. The method of claim 12, wherein the display is part of a mobile communication device configured to spin with the rotor.

19. The method of claim 18, wherein the mobile communication device comprises a smartphone.

20. The method of claim 18, wherein the graphic is a two-dimensional (2D) graphic, and wherein spinning the display generates an apparently three-dimensional (3D) image corresponding to the 2D graphic.

* * * * *